Figure 1:
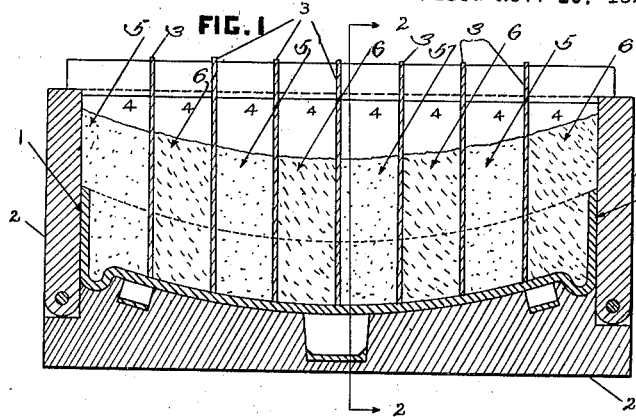

Oct. 20, 1925.

M. R. DE FRANCE

BRAKE SHOE

Filed Nov. 10, 1924

1,557,668

2 Sheets-Sheet 1

INVENTOR
Murrell R. De France
by William B. Wharton
his attorney

Oct. 20, 1925.

M. R. DE FRANCE 1,557,668

BRAKE SHOE

Filed Nov. 10, 1924

2 Sheets—Sheet 2

INVENTOR
Murrell R. De France
by William B. Wharton
his attorney

Patented Oct. 20, 1925.

1,557,668

UNITED STATES PATENT OFFICE.

MURRELL R. DE FRANCE, OF BELLEVUE, PENNSYLVANIA.

BRAKE SHOE.

Application filed November 10, 1924. Serial No. 748,863.

*To all whom it may concern:*

Be it known that I, MURRELL R. DE FRANCE, a citizen of the United States, residing at Bellevue, in the county of Allegheny and State of Pennsylvania, have invented a new and useful Improvement in a Brake Shoe, of which the following is a specification.

This invention relates to a pressed metal and composition brake shoe for use on railway cars and similar vehicles; and to the composition for filling the shell of such brake shoe.

For a long time previous to the present invention a wide variety of substances have been utilized in filling compositions for brake shoes. Among such substances may be noted fibrous asbestos, coke, cement, iron borings, iron ore, plaster, plumbago, rosin, sand, sawdust, wood, and other vegetable fibers. Various oxidizing vegetable oil and various gums have been used as a binder for these dry ingredients. When plaster or cement has been used as an ingredient of the composition, water has been added to set and harden the composition as a whole.

Brake shoes of the general type mentioned, that is brake shoes comprising a shell of pressed metal and a filling of a composition formed of various ingredients, present certain advantages over the cast metal brake shoes commonly in use. Such advantages reside chiefly in manufacturing economy, which is so great that composition brake shoes would largely displace cast metal shoes if the former performed under all conditions of use in as satisfactory a manner as the cast shoe.

It may be stated in connection with cast iron shoes, that the wear on the face of a cast iron brake shoe is by granulation. Under given pressure and load the friction produced by this shoe on a wheel increases in proportion to the square of pressure until the temperature of the shoe is that of a dull red heat, at which point the friction decreases in direct proportion to the further heat generated. It is to be understood, of course, that under an excessive pressure such as is produced by a stuck brake, a cast metal shoe, or any other brake shoe, would be burned up.

The wearing away of a composition brake shoe is by pulverization as contrasted with granulation. The wear of the composition shoe being by pulverization, the shoe and wheel in time become so highly polished that the contact between the two is almost perfect. When this condition is produced, an excessive friction greater than that specified for the purpose for which the shoe is used is developed. It will be understood that this perfect contact and excessive friction is a condition which is not possible with a brake shoe which wears away by granulation.

It should be understood, also, that the compositions which constitute the filling material for pressed shell and composition brake shoes, are very poor conductors of heat. This fact avoids limitation of the friction developed by the shoe, as is the case when a cast metal shoe reaches a red heat.

Previous failure of composition brake shoes to compete successfully with cast metal shoes may be traced to three defects, which had to be overcome in order to render them satisfactory under all conditions of use as the cast shoe. The first problem was to provide a suitable shell, which would not injure the tread of the wheel to which the brake was applied. This defect has been gradually eliminated by experiment and invention. The second problem was the development of a filling composition which would carry the crushing load of braking a wheel, independently of the shell in which the composition is carried. This problem is inherently connected with the first, as its solution was necessary in order to secure a shell which would not injure the tread of the wheel. It has also been successfully solved. The third problem has been the development of a composition filling which would conform to the specifications of railroads for requisite friction and life, and which would also approximate the functioning of a cast metal shoe under all conditions of service and at all times during the life of the shoe.

It is this latter problem which has hitherto remained unsolved, and which at the present time limits the use of composition brake shoes. The disadvantages which must be overcome are those of a wearing by pulverization to result in perfect contact between the brake shoe and wheel with a resultant development of friction in excess of that specified. For this reason the use of composition brake shoes has been limited to freight cars only. For if a composition shoe be placed on passenger cars, it will be found that the heat generated by excessive friction will be beyond the factor of safety in the operation of trains, and that serious injury to the treads of the wheels on such trains will be produced.

The manufacturers of composition brake shoes have been aware of this defect, and its disastrous consequences in the use of the brake shoes for years, but attempts to remedy this defect have hitherto been ineffective or impractical. During experimental work it was found that the various filling compositions would not develop uniform friction throughout the life of the brake shoe. Thus if the brake shoe was capable of giving the specified requisite friction upon its first application; by the time the shoe was partially worn away, and the shoe and the tread of the wheel to which it was applied had become thoroughly polished, the friction was far beyond the proper specifications. In conducting such work the inventor herein has made and tested composition brake shoes in which the coefficient of friction increased as greatly as thirty per cent during the life of the shoe. Compositions in which the coefficient of friction did not increase with use of the shoe varied from an insufficient initial friction to substantially no effective initial friction whatever.

The general object of the invention is therefore to provide a composition filler for a pressed metal shell which will produce a composition brake shoe capable of approximating the effect of a cast metal brake shoe under all conditions of use, and throughout the entire life of the shoe.

One specific object of the invention is to provide a filling composition for a brake shoe in which portions of the filling composition will throughout the life of the shoe wear away more readily than other portions thereof.

An object collateral to the above is to provide a filler for a pressed metal shell having the characteristics noted, which consists of a single integral block of filling composition.

Another specific object of the invention is to provide a filling block of frictional composition which comprises stratified areas of various ingredients possessing different coefficients of friction, such areas being so arranged or stratified that the composition filler presents initially and after it has been particularly worn away an effective face having areas with varying coefficients of friction and of varying rapidity of disintegration in use of the brake shoe.

Another object of the invention is to provide a filling composition for a pressed metal shell which comprises a relatively great proportion of a granular heat resisting ingredient.

Figure 2:
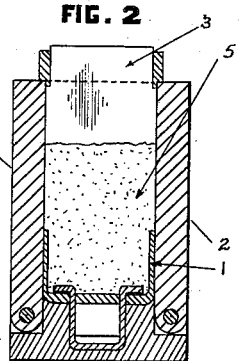
Figure 3:
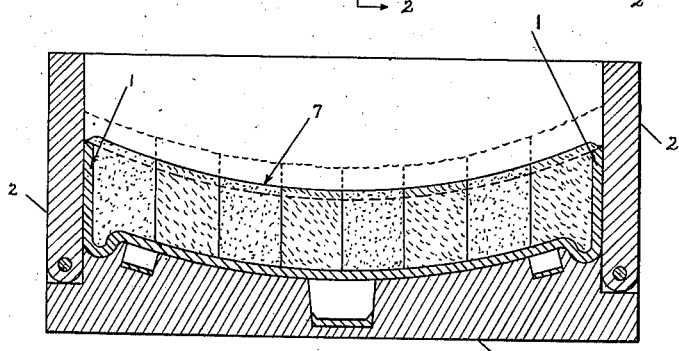
Figure 8:
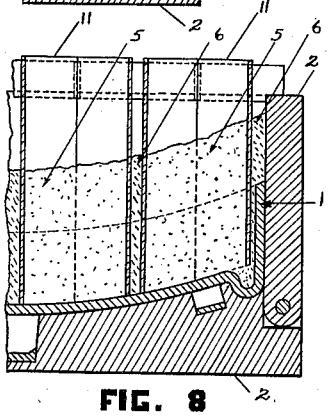
Figure 4:
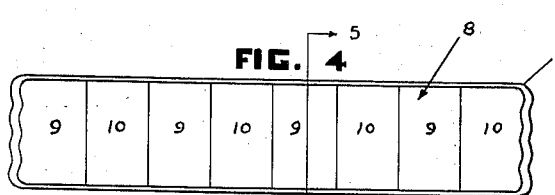
Figure 5:
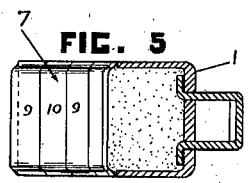
Figure 6:
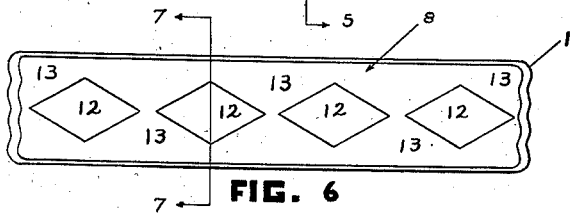
Figure 7:
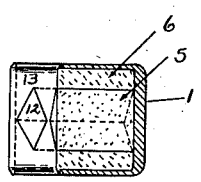
Figure 9:
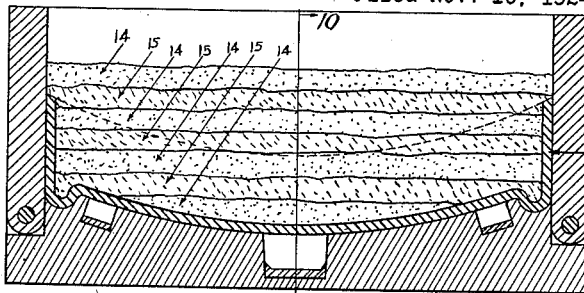
Figure 10:
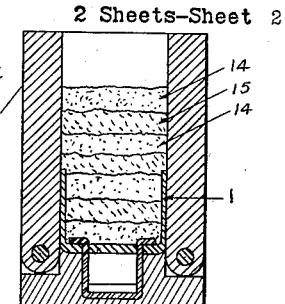
Figure 11:
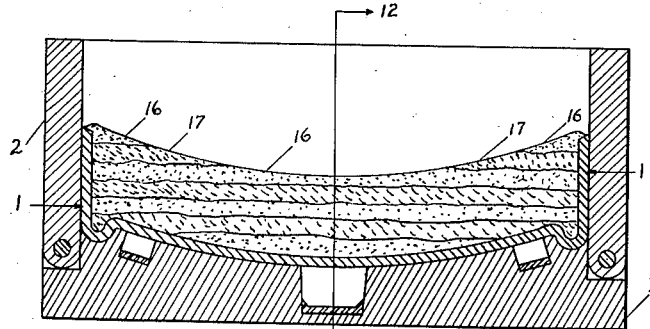
Figure 12:
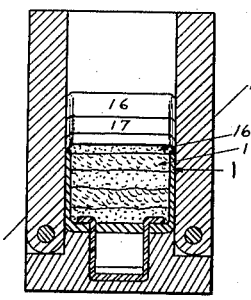
Figure 13:
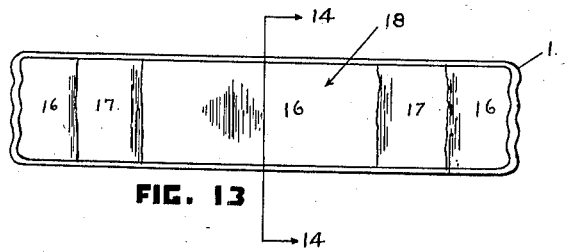
Figure 14:
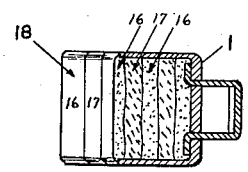
Figure 15:
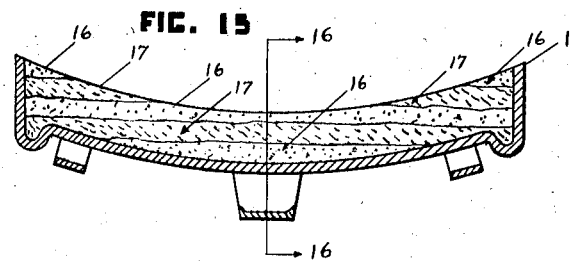
Figure 16:
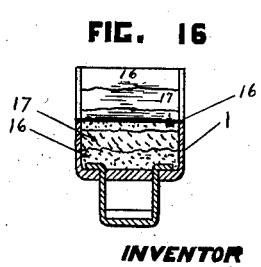

In the accompanying drawings Figure 1 is a vertical sectional view through a mold and brake shoe shell, illustrating one step in providing a shell with a composition filler according to the present invention; Figure 2 is a cross sectional view on the line 2—2 Figure 1; Figure 3 is a view similar to Figure 1, but illustrating a more advanced stage of the operation; Figure 4 is a bottom plan view of the completed brake shoe; Figure 5 is a cross sectional view on the line 5—5 Figure 4; Figure 6 is a bottom plan view of a brake shoe having a modified arrangement of the various areas of the filling composition; Figure 7 is a cross sectional view on the line 7—7 Figure 6; Figure 8 is a fragmentary vertical sectional view illustrating a step in the manufacture of the modified form shown in Figures 6 and 7; Figure 9 is a vertical sectional view through a mold and brake shoe shell illustrating one stage in the operation of filling the shell with a stratified filling composition, and showing a modification in the arrangement of the composition from that shown in the preceding figures of the drawings; Figure 10 is a cross sectional view on the line 10—10 Figure 9; Figure 11 is a view similar to Figure 9, but showing a more advanced stage of the filling operation; Figure 12 is a cross sectional view on the line 12—12 Figure 11; Figure 13 is a bottom plan view of a brake shoe filled in accordance with the arrangement illustrated in Figures 9 to 12 inclusive; Figure 14 is a cross sectional view on the line 14—14 Figure 13; Figure 15 is a vertical sectional view through the brake shoe shown in Figures 13 and 14, illustrating the condition of the brake shoe after it has been partially worn away in use; and Figure 16 is a cross sectional view on the line 16—16 Figure 15.

In the manufacture of the form of brake shoe shown in Figures 1 to 8 inclusive of the drawings, a brake shoe shell 1 of pressed metal is laid in a mold 2 in the position shown in Figures 1 to 3 and 8 of the drawings. Thin partition members 3, which may be composed of tin or other suitable material, are then inserted, as shown, so that they extend downwardly to the interior surface of the back of the shell and extend upwardly almost to the top of the mold. Filling composition in a plastic and readily compressible condition is then introduced into the compartments 4 formed in the brake shoe shell and mold by the partitions 3. In pursuance of the present invention, the filling composition used comprises two or more different grades. The drawings show composition of two different grades used to form the filling block of the brake shoe, the different grades of composition being introduced into alternate compartments throughout the length of the shell.

A suitable instrument is then introduced into each of the compartments 4, and both grades of filling composition 5 and 6 are pressed down into the position shown by dotted lines in Figure 3 of the drawings, to compact the composition. This operation may be performed by hand.

The final pressing operation is then performed under a relatively high pressure, and results in the formation of a single integral block of filling composition 7, which has along its working face 8 and extending vertically of the brake shoe shell alternate areas 9 and 10 formed by the different grades 5 and 6 of the filling composition. The brake shoe is then in condition for baking to effect the final hardening of the composition filling block 7.

It should be noted that the brake shoe as completed does not comprise a plurality of separate blocks, which must be interlocked or otherwise mutually secured to each other or held in position by a resilient pressure of the brake shoe shell. The block is, as stated, a single integral block, but consists of stratifications or areas providing areas of composition with different characteristics.

Instead of the vertically stratified areas of varying forms of composition, areas of one or more varying grades of composition may be introduced in a filling block having a surrounding area of uniform composition. This arrangement is shown in Figures 6, 7 and 8 of the drawings. In this modified arrangement the brake shoe shell 1 is provided with a filling block 11, which comprises areas 12 of one grade of composition and a surrounding area 13 of a dissimilar grade. The areas 12 and 13 both extend vertically the entire depth of the brake shoe shell, as is shown in Figure 8. In order to form a brake shoe having a filling block so arranged, it is only necessary to vary the arrangement shown in Figures 1 to 4 by introducing into the mold and shell partition members, which have closed sides, instead of the simple single wall partition as shown in the drawings. In such case one grade of composition in a plastic condition may be introduced outside the closed partition members or tubes, and one or more varying grades, likewise in plastic condition, introduced into the tubes. The operation of a preliminary pressing to compact the material, and the final pressing operation, are then identical with such steps as described above.

It will be understood that in this modified form of brake shoe the secondary composition may be introduced by means of tubular members of any desired form to provide areas of any desired shape in the final filler.

As has been previously stated, at least two formulæ should be employed in providing the composition of the different areas of the filling block. In order to effect the objects of the invention, these formulæ must be such that different areas having at least two different coefficients of friction are provided on the working face of the filling block not only initially but during the entire life of the brake shoe, as the block is worn away in use. It is also highly desirable that the material in one set of areas should tend to be worn away more rapidly than the material in the other set of areas. This is effected in practice by having one or more areas or sets of areas comprise material which tends to pulverization with great rapidity. This effect causes the working face of the block to be constantly covered with loose material, thus preventing perfect contact between the wheel and the area or areas which are less susceptible to disintegration. It is also desirable that a certain ingredient, or certain ingredients, of such area or areas be such as to cause the loose material to be as coarse as possible, thus approximating the effect of a cast metal brake shoe during its wear by granulation.

For purposes of illustration, several practicable formulæ, for use in various areas of the filling block, may be given as follows:

*Formula A.*
(Parts by weight.)

| | Parts. |
|---|---|
| Asbestos sand | 27.00 |
| Vegetable fibre | 10.00 |
| Coke | 13.00 |
| Oil | 5.50 |
| Total | 55.50 |

*Formula B.*
(Parts by weight.)

| | |
|---|---|
| Asbestos sand | 20.00 |
| Vegetable fibre | 10.00 |
| Flue dust | 20.00 |
| Oil | 5.50 |
| Total | 55.50 |

*Formula C.*
(Parts by weight.)

| | |
|---|---|
| Asbestos sand | 27.00 |
| Asbestos fibre | 12.00 |
| Coke | 8.00 |
| Metallic borings | 3.00 |
| Oil | 5.50 |
| Total | 55.50 |

*Formula D.*
(Parts by weight.)

| | |
|---|---|
| Asbestos sand | 27.00 |
| Vegetable fibre | 15.00 |
| Flue dust | 8.00 |
| Oil | 5.5 |
| Total | 55.50 |

It will be noted that a principal ingredient of all the formulæ, is asbestos sand, or granular asbestos. This ingredient has been added to others previously employed because experimentation with this material has demonstrated that it possesses several highly advantageous qualities. Because of its lesser density in mass, asbestos sand may be used in greater volume than silica sand, and may be more uniformly distributed through and among the other ingredients of the composition. It therefore wears off more readily and more uniformly in use of a brake shoe to provide a loose semi-granular layer between the tread of a wheel and the solid working face of the shoe.

The material herein referred to as "asbestor sand" or "granular asbestos" is obtained as screenings in obtaining fibrous asbestos. It is a dust, comprising both powdery and gritty particles, and in its chemical composition comprises silicate of magnesium with some admixture of other silicates. Because of its divided condition granular asbestos has in practical effect no fibrous characteristics.

Asbestos sand has all the heat resisting, and abrasive, qualities of silica sand; together with an equal or greater load carrying capacity or resistance to crushing. While the cost of asbestos sand is greater than that of silica sand, its use is more economical because it may be used in far greater volume to displace the still more expensive ingredients of a composition, such as fibrous asbestos, coke, and cement.

It will be noted that all the formulæ, comprising asbestos sand in a proportion in excess of thirty per cent by weight of the total composition. This means that it constitutes a far larger proportion by volume of the composition. In this connection it should be understood that fibrous asbestos creates a greater friction than does granular asbestos. This is because the fibrous asbestos tends to become polished on the working face of the brake shoe, while the granular asbestos tends to grain off to form the finely granular friction modifying layer on the working face of the brake shoe.

Thus the formula A comprises a relatively large percentage of granular asbestos, while the formula B comprises a lesser percentage of granular asbestos and a greater percentage of fibrous material. When, therefore, a filling block is formed of two grades of composition according to the formula A and B, the areas of composition according to formula B are the friction increasing and wear resisting areas and the areas of the composition according to formula A are the areas of rapid disintegration and friction modifying granulation.

When, however, the filling block comprises areas formed according to the more highly frictional formulæ C or D, either A or B, according to the specifications to be complied with, may be used in the rapidly disintegrating and friction modifying areas.

A modified arrangement of areas in the composition filling block is shown in Figures 9 to 16 inclusive of the drawings. In making a brake shoe in accordance with this modification, the brake shoe shell 1 is placed in a mold 2 with its hollow side upward in the same position shown in Figures 1 to 4 inclusive of the drawings. In this case, however, horizontal layers or strata 14 and 15 of two contrasted grades of filling composition in a plastic condition are introduced into the brake shoe shell 1 and mold 2. The entire body of composition within the mold is then compacted under a relatively high pressure from the position and condition shown in Figure 9 to the position and condition shown in Figure 11. In making a brake shoe with this modified filling block the initial light pressing operation may be dispensed with. This is because partition pieces used in making the previously described blocks are not needed; and because the layers or strata, being horizontally disposed, maintain their relative positions under the pressing operation.

As the strata 16 and 17 of the finished block lie horizontally, and as the working face 18 of the block is concave on an arc of relatively great curvature, the pressing operation results in the exposure of more than one stratum on the working face of the brake shoe. Due to these factors, moreover, more than one stratum or area will be exposed on the working face, as the brake shoe wears away, and throughout the entire life of the brake shoe.

This modified form of brake shoe, or rather of the block of filling composition thereof, presents the advantage of simplicity in manufacture over the form shown in Figures 1 to 8 inclusive of the drawings. Like it, however, the different grades of composition forming the block are compressed firmly into a single integral block.

It should be understood that the formulæ given above are illustrative only, and that various other ingredients and proportions may be employed to comply with the specifications for which each brake shoe is made. It is also to be noted that while areas composed of only two grades of composition are shown in the drawings, three or more grades may be incorporated in a single filling block, if this should prove in any instance desirable.

It should be further understood that composition filling blocks for pressed metal shells may be made by pressing the bodies of the different grades of composition together in a mold apart from the shell. This block may be then separately baked, and the metal shell folded and pressed around the integral block of filling composition.

What I claim is:

1. In a brake shoe comprising a pressed metal shell and a composition filler therefor, an integral block of filling composition divided into areas with different coefficients of friction, said filling block being so arranged as to maintain the diversity of friction produced by such areas throughout the entire life of the brake shoe.

2. In a brake shoe comprising a pressed metal shell and a composition filler therefor, an integral block of filling composition stratified into areas with different coefficients of friction.

3. In a brake shoe comprising a pressed metal shell and a composition filler therefor, an integral block of filling composition stratified into areas with different coefficients of friction, the composition in certain of said areas comprising granular asbestos as one of its principal ingredients.

4. In a brake shoe comprising a pressed metal shell and a composition filler therefor, an integral block of filling composition stratified vertically into areas with different coefficients of friction.

5. In a brake shoe comprising a pressed metal shell and a composition filler therefor, an integral block of filling composition stratified vertically into areas with different coefficients of friction, the composition in certain of such areas comprising granular asbestos as one of its principal ingredients.

6. In a brake shoe comprising a pressed metal shell and a composition filler therefor, an integral block of filling composition divided into areas with different coefficients of friction, the composition in certain of such areas comprising granular asbestos as one of its principal ingredients.

7. In a brake shoe comprising a pressed metal shell and a composition filler therefor, an integral block of filling composition divided into areas having different rates of disintegration in use of the brake shoe, said filling block being so arranged as to maintain the diversity in rate of disintegration in the various areas throughout the entire life of the brake shoe.

8. In a brake shoe comprising a pressed metal shell and a composition filler therefor, an integral block of filling composition stratified into areas having different rates of disintegration in use of the brake shoe.

9. In a brake shoe comprising a pressed metal shell and a composition filler therefor, an integral block of filling composition stratified into areas having different rates of disintegration in use of the brake shoe, the composition in certain of such areas comprising granular asbestos as one of its principal ingredients.

10. In a brake shoe comprising a pressed metal shell and a composition filler therefor, an integral block of filling composition stratified vertically into areas having different rates of disintegration in use of the brake shoe.

11. In a brake shoe comprising a pressed metal shell and a composition filler therefor, an integral block of filling composition stratified vertically into areas having different rates of disintegration in use of the brake shoe, the composition in certain of such areas comprising granular asbestos as one of its principal ingredients.

12. In a brake shoe comprising a pressed metal shell and a composition filler therefor, an integral block of filling composition divided into areas having different rates of disintegration in use of the brake shoe, the composition in certain of such areas comprising granular asbestos as one of its principal ingredients.

In witness whereof, I hereunto set my hand.

MURRELL R. DE FRANCE.